United States Patent
Iwao

(10) Patent No.: US 10,652,436 B2
(45) Date of Patent: May 12, 2020

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Tomoyori Iwao, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 122 days.

(21) Appl. No.: 15/897,042

(22) Filed: Feb. 14, 2018

(65) Prior Publication Data

US 2018/0241914 A1    Aug. 23, 2018

(30) Foreign Application Priority Data

Feb. 21, 2017   (JP) .................. 2017-030152

(51) Int. Cl.

| | |
|---|---|
| *G01B 11/25* | (2006.01) |
| *G06F 3/06* | (2006.01) |
| *H04N 13/00* | (2018.01) |
| *H04N 13/20* | (2018.01) |
| *H04N 13/254* | (2018.01) |
| *H04N 13/271* | (2018.01) |
| *H04N 5/217* | (2011.01) |
| *H04N 5/222* | (2006.01) |
| *H04N 5/232* | (2006.01) |

(52) U.S. Cl.
CPC ........... *H04N 5/2226* (2013.01); *G01B 11/25* (2013.01); *G06F 3/0602* (2013.01); *H04N 5/2173* (2013.01); *H04N 5/23212* (2013.01); *H04N 13/20* (2018.05); *H04N 13/271* (2018.05); *H04N 13/254* (2018.05); *H04N 2013/0074* (2013.01)

(58) Field of Classification Search
None
See application file for complete search history.

(56) References Cited

U.S. PATENT DOCUMENTS

| | | | |
|---|---|---|---|
| 8,134,555 B2 | 3/2012 | Debevec | |
| 8,363,929 B2 * | 1/2013 | Kojima | ............... G01B 11/2509 348/135 |
| 9,123,116 B2 * | 9/2015 | Debevec | ............... H04N 13/282 |
| 2008/0304081 A1 * | 12/2008 | Debevec | ................ G01B 11/25 356/612 |

(Continued)

*Primary Examiner* — Soo Shin
(74) *Attorney, Agent, or Firm* — Canon USA., Inc. IP Division

(57) ABSTRACT

An image processing apparatus includes an acquisition unit configured to acquire position information indicating a position of a light source for irradiating an object with light, an acquisition unit configured to acquire position information indicating a position where a normal is acquired in the object, an acquisition unit configured to acquire position information indicating a position of an image capturing apparatus for imaging the object irradiated with the light by the light source, a calculation unit configured to, based on the position information, calculate a normal at the position where a normal is acquired, and a correction unit configured to, according to a predetermined condition, correct the position where a normal is acquired, wherein in a case where the correction unit corrects the position where a normal is acquired, the calculation unit calculates a normal at the corrected position where a normal is acquired.

18 Claims, 6 Drawing Sheets

(56) References Cited

U.S. PATENT DOCUMENTS

| | | | | |
|---|---|---|---|---|
| 2010/0328677 A1* | 12/2010 | Debevec | ............... | G01N 21/55 |
| | | | | 356/600 |
| 2014/0268160 A1* | 9/2014 | Debevec | ............... | G01N 21/55 |
| | | | | 356/445 |
| 2016/0261850 A1* | 9/2016 | Debevec | ............. | H04N 13/243 |
| 2018/0023947 A1* | 1/2018 | Meng | .................... | G01B 11/25 |
| | | | | 348/46 |

* cited by examiner

IMAGE PROCESSING APPARATUS, IMAGE PROCESSING METHOD, AND STORAGE MEDIUM

BACKGROUND

Field of the Disclosure

The present disclosure generally relates to imaging and, more particularly, to an image processing apparatus, an image processing method, a storage medium, and an image processing technique for calculating a normal to an object.

Description of the Related Art

As a technique of calculating a normal to an object from a captured image of the object, a technique of irradiating the object with light using multiple illumination, and calculating the normal from the specularly reflected light from the object is known (U.S. Pat. No. 8,134,555 B2). In the technique of calculating the normal from the specularly reflected light, a normal calculation target object is irradiated with light from multiple illumination of which the luminances spatially change, and the reflected light from the normal calculation target object is made incident on an image capturing apparatus. Then, diffusely reflected light is excluded from the reflected light, and only specularly reflected light is extracted from the reflected light. Then, based on the intensity of the specularly reflected light, the position of a light source emitting light to be regularly reflected from the object and incident on the image capturing apparatus is calculated. Finally, a light source vector and a line-of-sight vector are calculated from the position of the light source, the position of the image capturing apparatus, and a normal acquisition position (the position of the starting point of a normal to the normal calculation target object), and a normal is calculated from the light source vector and the line-of-sight vector.

In U.S. Pat. No. 8,134,555 B2, however, the light source vector and the line-of-sight vector are calculated on the assumption that the normal acquisition position is a particular single point (e.g., the center of a multiple illumination apparatus). Thus, in a case where the normal calculation target object has a certain size, the light source vector and the line-of-sight vector cannot be accurately calculated. That is, in a case where the normal calculation target object has a non-negligible size, the normal acquisition position on the object is not determined as a single point. Thus, if the normal acquisition position is set to a particular single point as in U.S. Pat. No. 8,134,555 B2, the light source vector and the line-of-sight vector cannot be accurately calculated. Thus, in the technique in U.S. Pat. No. 8,134,555 B2, the calculation accuracy of a normal decreases.

SUMMARY

The present disclosure generally relates to, regardless of the size of a normal calculation target object, calculating a normal to the object with higher accuracy.

According to one or more aspects of the present disclosure, an image processing apparatus includes a first acquisition unit configured to acquire first position information indicating a position of a light source for irradiating an object with light, a second acquisition unit configured to acquire second position information indicating a position where a normal is acquired in the object, a third acquisition unit configured to acquire third position information indicating a position of an image capturing apparatus for imaging the object irradiated with the light by the light source, a calculation unit configured to, based on the first position information, the second position information, and the third position information, calculate a normal at the position where a normal is acquired, and a correction unit configured to, according to a predetermined condition and using the calculated normal, correct the position where a normal is acquired, wherein in a case where the correction unit corrects the position where a normal is acquired, then based on the first position information, the third position information, and the corrected position where a normal is acquired, the calculation unit calculates a normal at the corrected position where a normal is acquired.

Further features of the present disclosure will become apparent from the following description of exemplary embodiments with reference to the attached drawings.

DESCRIPTION OF THE EMBODIMENTS

Exemplary embodiments of the present disclosure will be described below with reference to the drawings. The following exemplary embodiments do not limit the present disclosure, and not all the combinations of the features described in the present exemplary embodiments are essential for the present disclosure. The configurations of the exemplary embodiments can be appropriately modified or changed depending on the specifications of an apparatus to which the present disclosure is applied, or various conditions (the use conditions and the use environment).

In a first exemplary embodiment, the process of acquiring a depth from a normal calculated by a conventional method and calculating a normal again using the acquired depth is repeatedly performed, thereby calculating a normal with high accuracy. That is, a normal acquisition position of a normal calculation target object is calculated from a depth acquired by repetitive processing, and a line-of-sight vector and a light source vector are corrected when a normal is calculated, thereby improving the calculation accuracy of a normal. A "depth" refers to the distance from an image capturing apparatus to the normal calculation target object.

(Configuration of Image Processing Apparatus)

Figure 1:
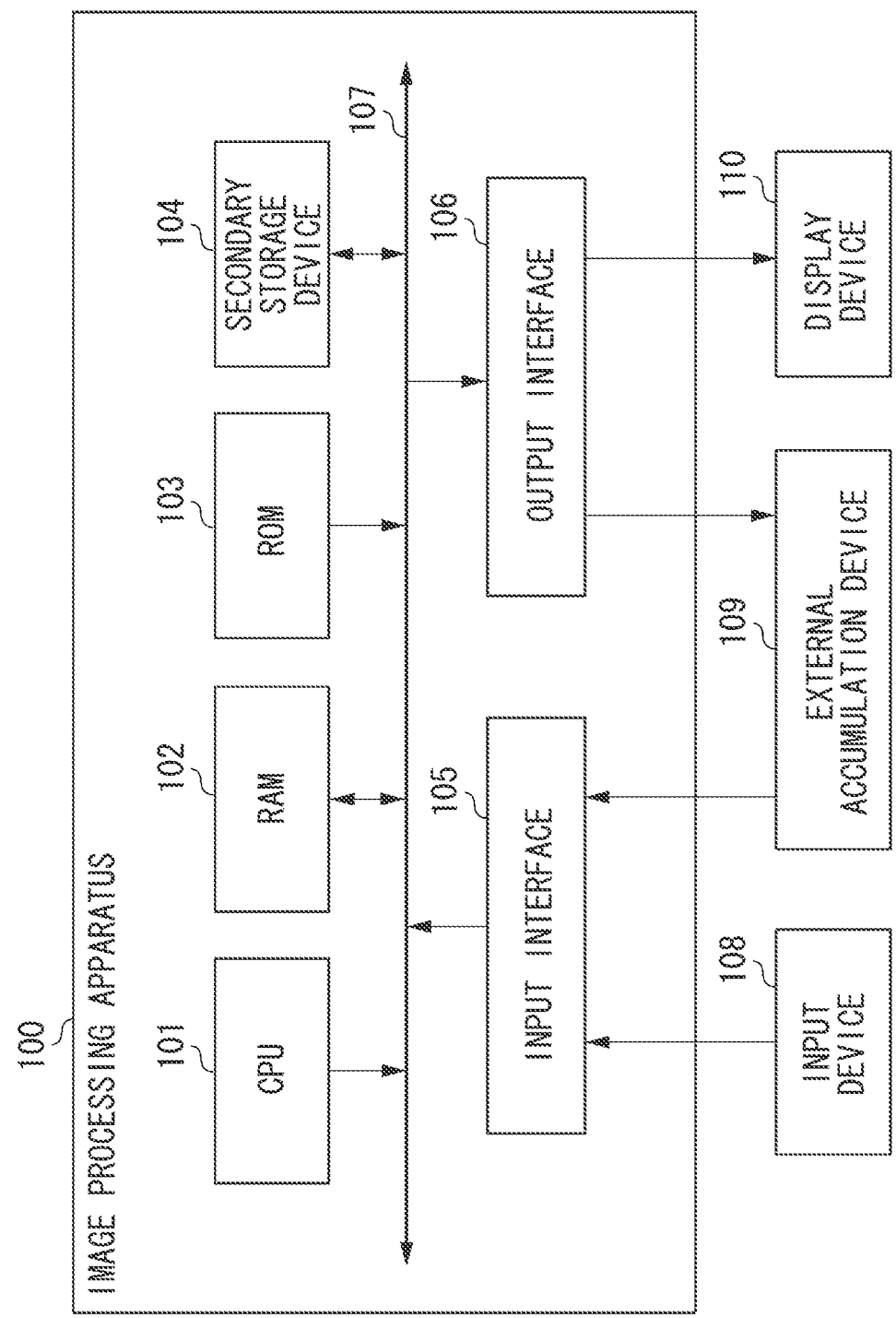
FIG. 1 is a block diagram illustrating a configuration of an image processing apparatus.

FIG. 1 is a diagram illustrating an example of the configuration of an image processing apparatus 100. The image processing apparatus 100 includes a central processing unit (CPU) 101, a random-access memory (RAM) 102, a read-only memory (ROM) 103, a secondary storage device 104, an input interface 105, an output interface 106, and a system bus 107. The image processing apparatus 100 is connected to an input device 108, an external accumulation device 109, and a display device 110. More specifically, the input device 108 is connected to the input interface 105 of the image processing apparatus 100, and the external accumulation device 109 is connected to the input interface 105 and the output interface 106 of the image processing apparatus 100. Further, the display device 110 is connected to the output interface 106 of the image processing apparatus 100.

The CPU 101, which may include one or more processors and one or more memories, is a processing circuit for executing one or more programs stored in the ROM 103, using the RAM 102 as a work memory, thereby performing overall control of the components of the image processing apparatus 100 via the system bus 107. The CPU 101 executes the program, thereby executing various types of processing described below.

The secondary storage device 104 is a memory capable of accumulating, via the system bus 107, data to execute the program(s). Further, the data accumulated in the secondary storage device 104 can be read via the system bus 107. As the secondary storage device 104, a storage device such as a hard disk drive (HDD), an optical disc drive, or a flash memory can be used.

The input interface 105 is a serial bus interface based on, for example, Universal Serial Bus (USB) or the Institute of Electrical and Electronics Engineers (IEEE) 1394. The image processing apparatus 100 can acquire data from the input device 108 or the external accumulation device 109 via the input interface 105.

The output interface 106 is a video output terminal such as a Digital Visual Interface (DVI) or a High-Definition Multimedia Interface (HDMI) (registered trademark). The image processing apparatus 100 can display a processed image on the display device 110 via the output interface 106. The output interface 106 is a serial bus interface based on, for example, USB or IEEE 1394. The image processing apparatus 100 can accumulate data in the external accumulation device 109 via the output interface 106.

The input device 108 is used when a user inputs desired information or data to the image processing apparatus 100. The input device 108 includes, for example, a keyboard, a mouse, a touch panel, and an audio input unit.

The external accumulation device 109 is, for example, a hard disk, a memory card, a CompactFlash (CF) card, a Secure Digital (SD) card, or a USB memory.

The display device 110 is an output device such as a liquid crystal display. The display device 110 may include an audio output unit.

Although there can also be a component (e.g., a communication unit for communicating with an external device) other than the above components in the image processing apparatus 100, a component unrelated to the calculation of a normal is not described in the specification.

(Configuration of Normal Calculation System)

Figure 2A:
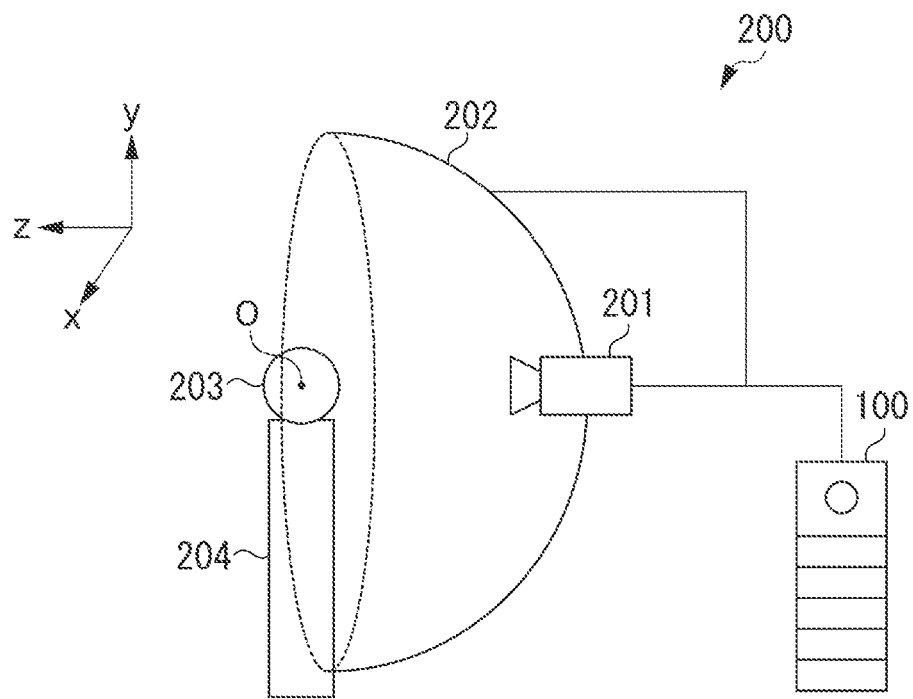
FIGS. 2A and 2B are diagrams illustrating an example of a normal calculation system.

FIG. 2A illustrates the general configuration of a normal calculation system 200. As illustrated in FIG. 2A, the normal calculation system 200 includes the image processing apparatus 100, an image capturing apparatus 201, a light source apparatus 202, and an image capturing stage 204. The normal calculation system 200 calculates a normal to a normal calculation target object (hereinafter referred to as an "object") 203. The object 203 is a spherical body, for example. The image processing apparatus 100 is connected to the image capturing apparatus 201 and the light source apparatus 202. The normal calculation system 200 is an image processing system including the image processing apparatus 100.

The image capturing apparatus 201 captures an image of the object 203. The image capturing apparatus 201 is a camera, for example.

The light source apparatus 202 is an illumination apparatus including a plurality of point light sources. The arrangement of the point light sources will be described below with reference to FIG. 2B.

The image capturing stage 204 is a stage (a placement platform) on which the object 203 is placed. The image capturing stage 204 is configured to be extensible and contractible or configured to be movable so that the object 203 can be placed at a center O of the light source apparatus 202.

(Plurality of Point Light Sources of Light Source Apparatus)

Figure 2B:
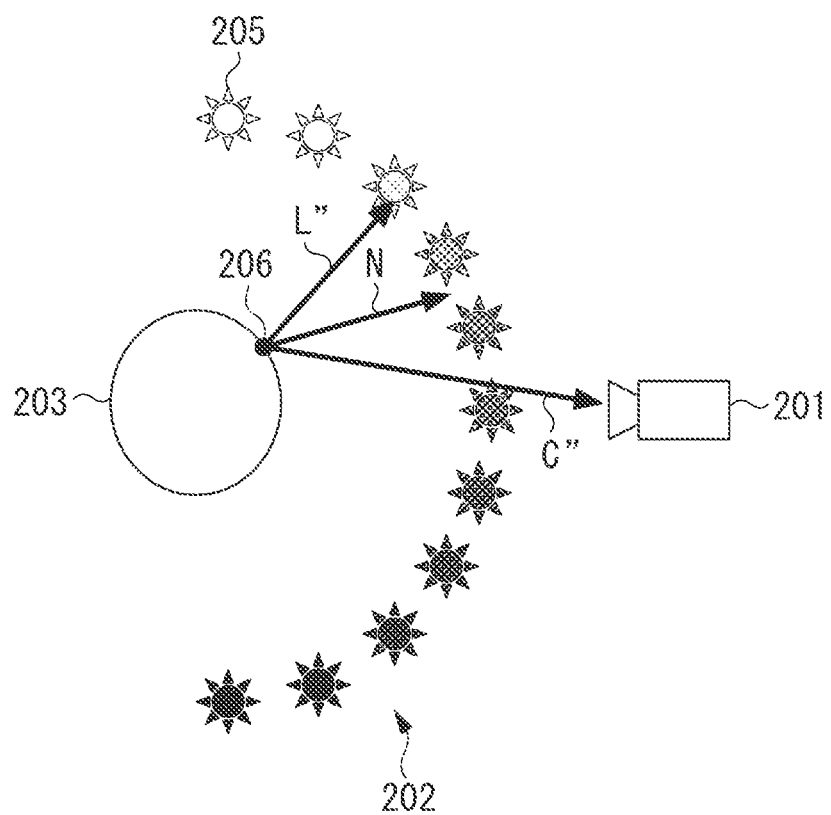

FIG. 2B illustrates the state where the light source apparatus 202 irradiates the object 203 with light. As illustrated in FIG. 2B, the light source apparatus 202 includes a plurality of illumination lamps (point light sources) 205. The point light sources 205 are discretely and spherically arranged. The light source apparatus 202 can cause the point light sources 205 to emit light at different luminances. That is, the light source apparatus 202 can continuously (gradually, smoothly, or step by step) change the luminances of the point light sources 205 (gradient illumination). Further, the light source apparatus 202 can also cause the point light sources 205 to emit light at the same luminance (uniform illumination). FIG. 2B illustrates the state where the light source apparatus 202 irradiates the object 203 with light from the point light sources 205 at different luminances.

A vector L" from the object 203 to each point light source 205 is a ray vector. A vector C" from the object 203 to the image capturing apparatus 201 is a line-of-sight vector. A vector N is a normal vector. A point 206 on the object 203 represents a normal acquisition position (the position of the starting point of the normal N). The position of the image capturing apparatus 201 is different from that in FIG. 2A for illustration reasons.

Next, with reference to a block diagram illustrated in FIG. 3 and a flowchart illustrated in FIG. 4, processing performed by the image processing apparatus 100 will be described. The CPU 101 executes a program stored in the ROM 103, using the RAM 102 as a work memory, whereby the image processing apparatus 100 functions as blocks illustrated in FIG. 3 and performs the processes of steps illustrated in FIG. 4. Not all the processing illustrated below needs to be executed by the CPU 101. Alternatively, the image processing apparatus 100 may be configured such that part or all of the processing may be performed by one or more processing circuits other than the CPU 101.

(Functional Block Diagram of Image Processing Apparatus)

Figure 3:
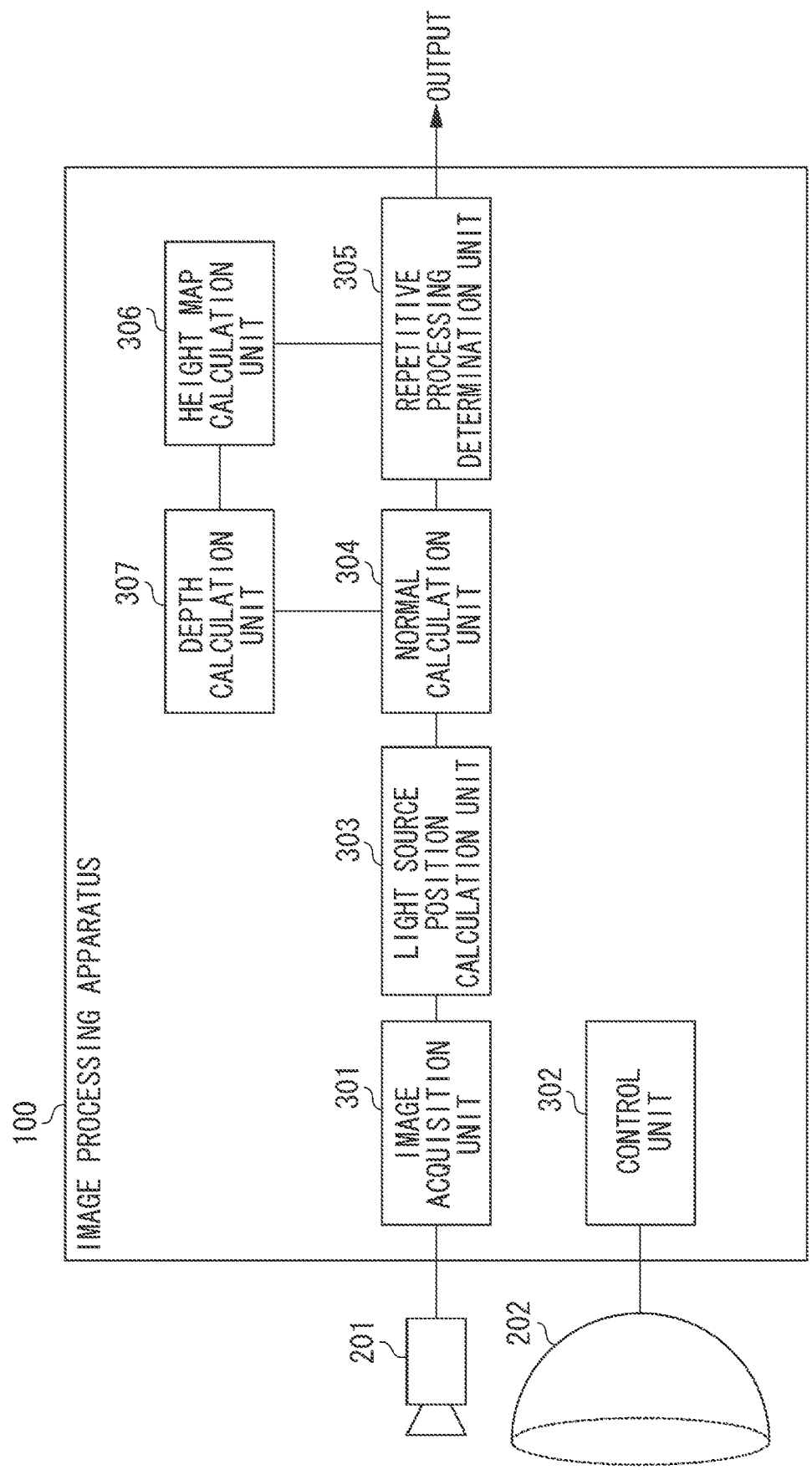
FIG. 3 is a functional block diagram of the normal calculation system.
Figure 4:
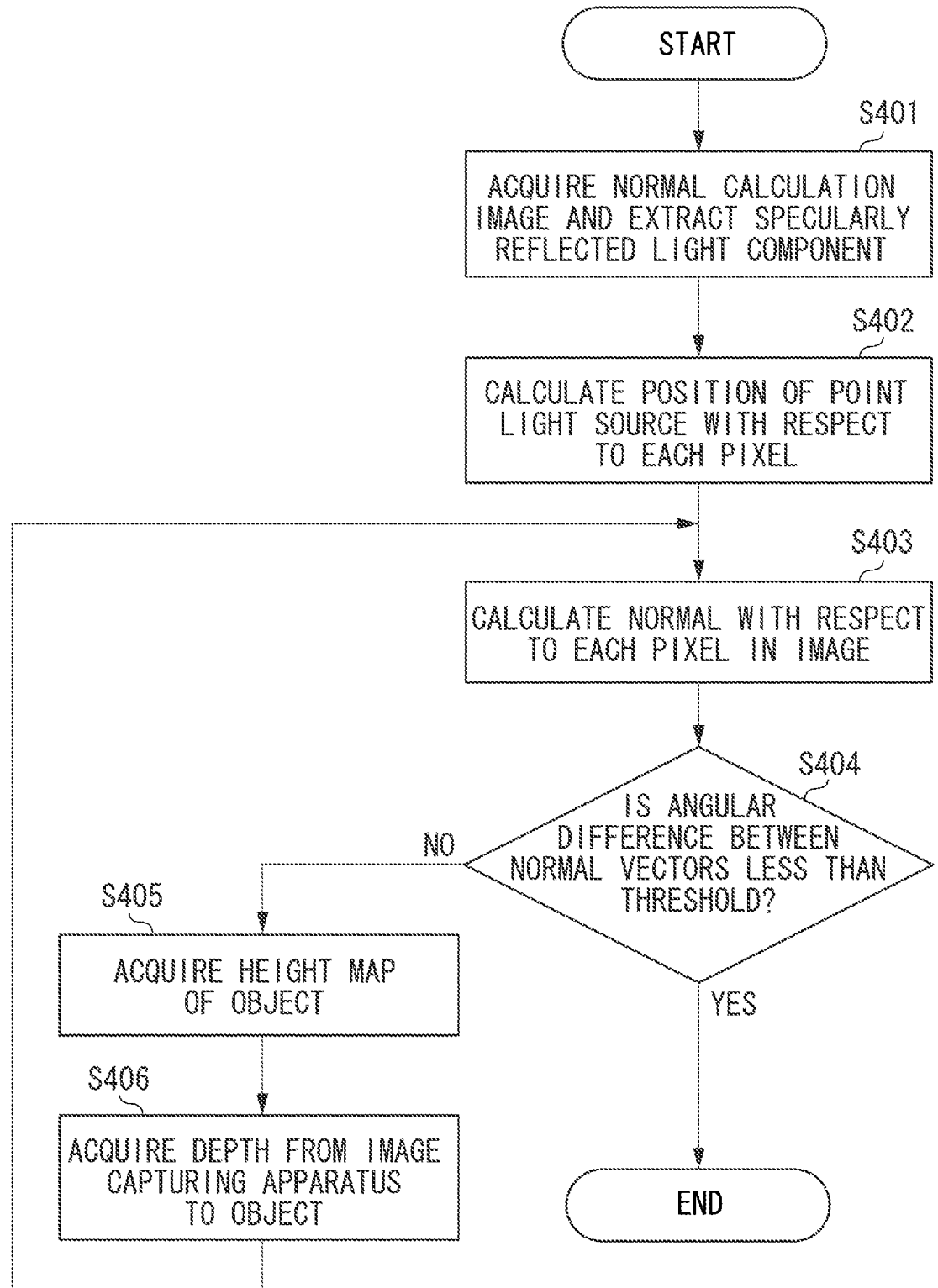
FIG. 4 is a flowchart illustrating processing performed by the image processing apparatus.

As illustrated in FIG. 3, the image processing apparatus 100 includes as functional blocks an image acquisition unit 301, a control unit 302, a light source position calculation unit 303, a normal calculation unit 304, a repetitive processing determination unit 305, a height map calculation unit 306, and a depth calculation unit 307.

The image acquisition unit 301 acquires an image from the image capturing apparatus 201 having captured the object 203 irradiated by the light source apparatus 202. Further, the image acquisition unit 301 extracts a specularly reflected light component from the image of the object 203.

According to a predetermined rule (e.g., three types of gradient illumination patterns and one type of uniform illumination pattern), the control unit 302 lights up the point light sources 205 of the light source apparatus 202. The control unit 302 irradiates the object 203 with light emitted from the light source apparatus 202 so that the image capturing apparatus 201 can capture the object 203.

The light source position calculation unit 303 calculates (acquires), with respect to each pixel in the image, the position of a point light source 205 for calculating a normal.

The normal calculation unit 304 calculates a normal from the depth (the normal acquisition position 206) of the object 203, the position of the image capturing apparatus 201, and the position of the point light source 205. The position of the image capturing apparatus 201 may be input from the input device 108 to the image processing apparatus 100 in advance or acquired while an image is captured. Information about the position of the image capturing apparatus 201 is, for example, input from the input device 108 to the RAM 102, stored in the RAM 102, and acquired from the RAM 102 by the normal calculation unit 304 when needed.

The repetitive processing determination unit 305 determines under a predetermined condition whether repetitive processing (described below) is to be continued. If it is determined that the repetitive processing is not to be continued, the repetitive processing determination unit 305 determines that the normal calculated by the normal calculation unit 304 is appropriate. Then, the repetitive processing determination unit 305 outputs the normal from the image processing apparatus 100. If it is determined that the repetitive processing is to be continued, the repetitive processing determination unit 305 determines that the normal calculated by the normal calculation unit 304 is not appropriate. Then, the repetitive processing determination unit 305 outputs the normal to the height map calculation unit 306.

The height map calculation unit 306 creates (calculates) a height map of the pixels in the image from the normal.

The depth calculation unit 307 converts the height map into a depth map. The depth of the object 203 is input from the depth calculation unit 307 to the normal calculation unit 304. The depth of the object 203 can be used as the normal acquisition position 206. Thus, it can be said that the depth calculation unit 307 corrects the normal acquisition position 206 using the calculated normal.

The units described throughout the present disclosure are exemplary and/or preferable modules for implementing processes described in the present disclosure. The modules can be hardware units (such as circuitry, firmware, a field programmable gate array, a digital signal processor, an application specific integrated circuit, a component, or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

(Processing Flow of Image Processing Apparatus)

In step S401, the image acquisition unit 301 acquires an image of the object 203 as a processing target from the image capturing apparatus 201. That is, the image acquisition unit 301 acquires a normal calculation image from the image capturing apparatus 201. Then, the image acquisition unit 301 outputs the normal calculation image to the light source position calculation unit 303.

The image (the normal calculation image) acquired in step S401 is a group of images obtained by imaging the object 203 illuminated by the light source apparatus 202 lit up according to a predetermined rule (predetermined illumination patterns) by the control unit 302. The "predetermined rule" refers to, for example, illumination patterns for calculating a normal using specularly reflected light as illustrated in U.S. Pat. No. 8,134,555 B2. In U.S. Pat. No. 8,134,555 B2, the luminances of multiple illumination (a plurality of point light sources 205) which are discretely arranged and of which the luminances can be continuously changed as in the light source apparatus 202 are smoothly changed in x-, y-, and z-axis directions orthogonal to one another, thereby performing illumination in three types of gradient illumination patterns. That is, one type of pattern is created by smoothly changing the luminances in the x-axis direction. Then, one type of pattern is created by smoothly changing the luminances in the y-axis direction. Then, one type of pattern is created by smoothly changing the luminances in the z-axis direction. Then, the object 203 is irradiated with light.

A radiance $L_1$ of a point light source 205 present in a direction at an angle $\theta_1$ when viewed from the center O of the light source apparatus 202 can be represented by formula (1), using a unit vector $\omega$, which indicates the direction of a ray incident on the center O of the light source apparatus 202, and a constant c. In formula (1), i represents either of x, y, and z. Further, $\theta_i$ represents the angle between a straight line connecting the center O of the light source apparatus 202 and the point light source 205, and the i-axis. The center O of the light source apparatus 202 is also the center of the object 203.

$$L_i(\theta_i) = c\omega_i(\theta_i) \qquad (1)$$

Next, the control unit 302 lights up all the point light sources 205 at the same luminance (uniform illumination). In the case of uniform illumination, the radiance of each point light source 205 is represented by formula (2), regardless of the angle $\theta$.

$$L_c = c \qquad (2)$$

At this time, a single polarizing plate is placed in the point light source 205, and another polarizing plate is placed in the image capturing apparatus 201. Then, images are captured in two ways, namely in a case where the directions of the main axes of the polarizing plate placed in the point light source 205 and the polarizing plate placed in the image capturing apparatus 201 are orthogonal to each other, and in a case where the directions of the main axes are parallel to each other. The image acquisition unit 301 obtains the difference between these images, thereby extracting a specularly reflected light component (hereinafter referred to as "specularly reflected light"). The group of captured images is stored in the RAM 102 or the secondary storage device 104. The extraction of the specularly reflected light is not limited to this method. For example, the specularly reflected light can also be extracted through the use of a method using a dichroic reflection model. The image acquisition unit 301 outputs the specularly reflected light to the light source position calculation unit 303.

In step S402, based on the group of normal calculation images, the light source position calculation unit 303 calculates the position (hereinafter referred to as a "light source position") of, among the plurality of point light sources 205, a point light source 205 emitting specularly reflected light to be regularly reflected from the object 203 and incident on the image capturing apparatus 201, with respect to each pixel. If a specular reflection coefficient at each pixel (x', y') is $\rho(x', y')$, a luminance (a reflection intensity) I observed using the image capturing apparatus 201 can be represented with respect to each pixel by formula (3) in the case of gradient illumination, and can be represented by formula (4) in the case of uniform illumination.

$$I_i(\theta_i, x', y') = \rho(x', y') c \omega_i(\theta_i) \quad (3)$$

$$I_c = \rho(x', y') c \quad (4)$$

Formula (3) is divided by formula (4), thereby obtaining formula (5).

$$\frac{I_i(\theta_i)}{I_c} = \omega_i(\theta_i) \quad (5)$$

An x-component, a y-component, and a z-component of the incident light vector ω are obtained from formula (5). Thus, it is possible to identify a position (a light source position) L' where the point light source 205 emitting light to be specularly reflected (specularly reflected light) is present. In this manner, in step S402, the light source position calculation unit 202 acquires information indicating the position of the light source with respect to each pixel in the image.

In step S403, the normal calculation unit 304 calculates a normal with respect to each pixel in the image from the depth of the object 203, the position of the image capturing apparatus 201, and the light source position output from the depth calculation unit 307. The depth of the object 203 can be used as information indicating the normal acquisition position 206. A depth V'(x', y') corresponding to the pixel (x', y') in the image captured by the image capturing apparatus 201 represents the distance in the depth direction from the image capturing apparatus 201 to each point (the normal acquisition position 206) of the object 203. Thus, if the maximum value of the depth is $V'_{max}$, the width of the image is w, the height of the image is h, and the center pixel in the image is ($x_o'$, $y_o'$), a normal acquisition position vector P at the pixel (x', y') is represented by formula (6), using a horizontal angle of view $\varphi_H$ and a vertical angle of view $\varphi_V$. The normal acquisition position vector P is a vector starting from the origin of the coordinate system of the image capturing apparatus 201. The horizontal angle of view $\varphi_H$ and the vertical angle of view $\varphi_V$ are angles of view of the image capturing apparatus (camera) 201.

$$P(x', y') = \left( \frac{2V'_{max} \tan\phi_H}{w}(x' - x_o'), \frac{2V'_{max} \tan\phi_V}{h}(y' - y_o'), V'(x', y') \right) \quad (6)$$

The line-of-sight vector C" and the incident ray vector L" are represented by formulas (7) and (8), respectively, if a position vector of the image capturing apparatus 201 is C', a position vector of the point light source 205 is L', and the normal acquisition position vector P is used.

$$C''(x', y') = C'(x', y') - P(x', y') \quad (7)$$

$$L''(x', y') = L'(x', y') - P(x', y') \quad (8)$$

The normal vector N is calculated by formula (9), using the line-of-sight vector C" and the incident ray vector L".

$$N(x', y') = \frac{C''(x', y') + L''(x', y')}{\|C''(x', y') + L''(x', y')\|} \quad (9)$$

Figure 5:
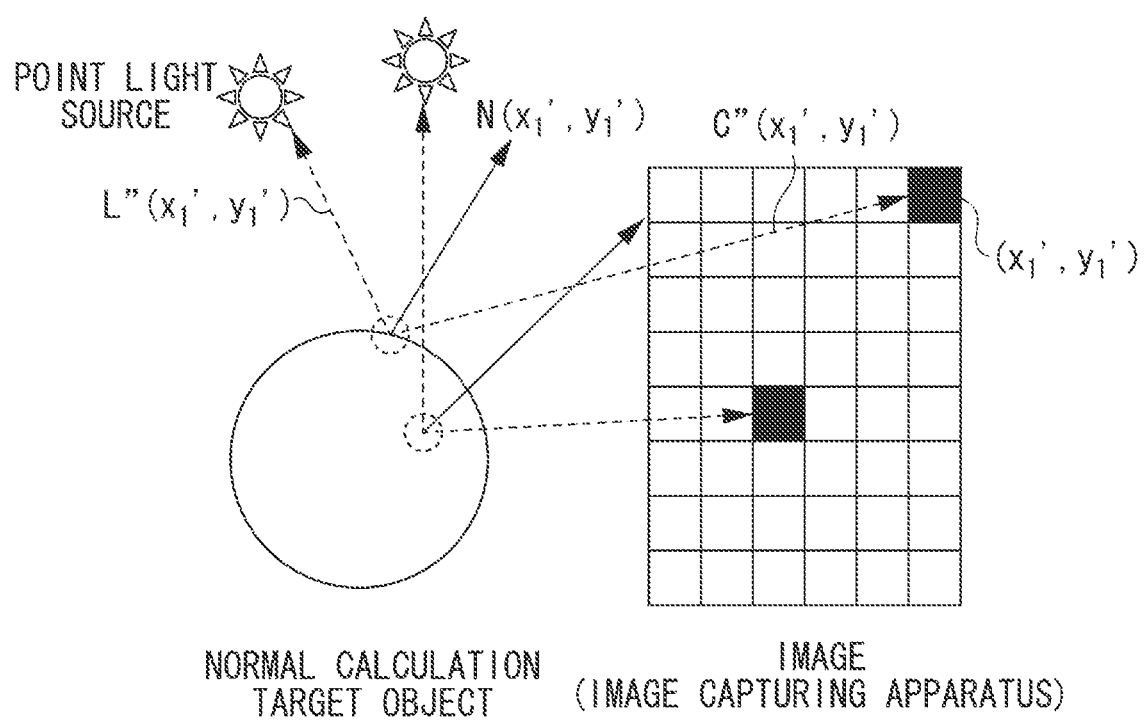
FIG. 5 is a schematic diagram illustrating a method of calculating a normal with respect to each pixel in the normal calculation system.

FIG. 5 illustrates a schematic diagram of the calculation of a normal with respect to each pixel. As illustrated in FIG. 5, the line-of-sight vector C" and the incident ray vector L" are different at each pixel. Thus, the normal vector N to be calculated is also different at each pixel.

In the first repetitive processing (loop processing), the depth of the object 203 is unknown. Thus, the normal acquisition position 206 is the center O of the light source apparatus 202. In the second loop processing and thereafter, the depth of the object 203 output from the depth calculation unit 307 is used. "Loop processing" refers to processing performed in the loop of steps S403-S404-S405-S406-S403. Alternatively, data indicating the shape or the depth of the object 203 generated in advance may be acquired and used for the first processing. The data indicating the shape or the depth of the object 203 can be generated by, for example, a known method such as stereo matching.

In step S404, a determination is made using the angle between a normal vector $N_m(i, j)$ of a pixel (i, j) output from the normal calculation unit 304 in m-th loop processing and a normal vector $N_{m-1}(i, j)$ of the pixel (i, j) output from the normal calculation unit 304 in (m−1)-th loop processing. More specifically, in step S404, based on whether the angle (the angular difference) between the normal vectors $N_m(i, j)$ and $N_{m-1}(i, j)$ is less than a threshold φ, the repetitive processing determination unit 305 determines whether repetitive processing is necessary. The threshold φ is, for example, input and set in advance by the user, using the input device 108. A plurality of angular differences are obtained between the normal vectors. Thus, in step S404, the average value of the plurality of differences is used. Based on whether the average value of the angular differences between the plurality of normal vectors is less than the threshold φ, the repetitive processing determination unit 305 determines whether repetitive processing is necessary. In the first loop processing, a predetermined normal vector $N_0(i, j)$ is used. For example, a normal to the object 203 parallel to the direction of the optical axis of the image capturing apparatus 201 is the normal vector $N_0(i, j)$.

In step S404, for example, a normal map where the value of a normal vector is stored with respect to each pixel is used. A condition for determining the necessity of repetitive processing in step S404 can be represented by formula (10).

$$\frac{\sum_{j=1}^{h} \sum_{i=1}^{w} \cos^{-1}(N_m(i, j) N_{m-1}(i, j))}{wh} \leq \phi \quad (10)$$

If repetitive processing is not necessary (Yes in step S404), the loop processing ends. Then, the repetitive processing determination unit 305 outputs the normal input from the normal calculation unit 304 as it is. If repetitive processing is necessary (No in step S404), the repetitive processing determination unit 305 outputs the input normal to the height map calculation unit 306.

In step S405, the height map calculation unit 306 calculates a height map from the normal output from the repetitive processing determination unit 305, thereby acquiring a height map of the object 203. The height map calculation unit 306 outputs the acquired height map to the depth calculation unit 307. If a normal vector at each pixel (i, j) is N(i, j), a height V(i, j) of each pixel is represented by formula (11).

$$V(i, j) = \sum_{x=0}^{i-1} \frac{N_x(x, j)}{N_z(x, j)} + \sum_{y=0}^{j-1} \frac{N_x(i, y)}{N_z(i, y)} \qquad (11)$$

The height map is data in which the height from a certain plane (a reference plane for the height map) orthogonal to the optical axis of the image capturing apparatus 201 is stored in an n-bit monochrome image, and represents the height distribution of the surface of the object 203.

In step S406, the depth calculation unit 307 converts the height map output from the height map calculation unit 306 into a depth map regarding the depth from the image capturing apparatus 201 to the object 203, thereby acquiring (calculating) a depth. In the height map, the height from the reference plane is stored in a monochrome image. Thus, a distance d from the image capturing apparatus 201 to the reference plane is determined, whereby it is possible to determine the depth from the image capturing apparatus 201 to the object 203. In response, on the assumption that the object 203 is near the center O of the spherically arranged point light sources 205, the rate of change in a normal $N_d(i, j)$ when the distance d is changed near the distance from the image capturing apparatus 201 to the center O of the point light sources 205 is calculated, and a distance d minimizing the rate of change is adopted. For example, suppose that the range of the value of height stored in the height map is from 0 to a. Then, if the luminance value at a depth V'(i, j) in the depth map is I'(i, j), the depth V'(i, j) from the image capturing apparatus 201 to the object 203 at the pixel (i, j) is represented by formula (12). The range of the value of height is specified by the user, using the input device 108, according to the size of the object (the object 203).

$$V'(i, j) = d - \frac{aI'(i, j)}{2^n - 1} \qquad (12)$$

V' represents the distance from the image capturing apparatus 201 to the object 203. Thus, the normal acquisition position vector P is calculated from formula (6), using V'. The line-of-sight vector C" and the incident ray vector L" are calculated from formulas (7) and (8), respectively, using the normal acquisition position vector P. Then, the normal vector N is calculated from formula (9), using the line-of-sight vector C" and the incident ray vector L". That is, the normal vector N is calculated from the sum of the line-of-sight vector C" and the incident ray vector L". In a case where d is calculated, a normal vector is calculated by changing, by Δd, the distance from the image capturing apparatus 201 to the reference plane for the height map, and d minimizing the rate of change in the normal vector is calculated. That is, d satisfying formula (13) if the width of the image in the height map is w and the height of the image is h is adopted.

$$\hat{d} = \operatorname{argmin}\left(\frac{\sum_{j=1}^{h}\sum_{i=1}^{w} \cos^{-1}(N_d(i, j)N_{d-\Delta d}(i, j))}{wh}\right) \qquad (13)$$

After a normal is calculated from formulas (6), (7), (8), (9), and (12), using the d^ (step S403), then similarly to the above, it is determined whether repetitive processing is necessary (step S404). If repetitive processing is not necessary (Yes in step S404), the normal is output as it is. If repetitive processing is necessary (No in step S404), a normal is repeatedly calculated by a similar procedure. In the present exemplary embodiment, when it is determined that repetitive processing is not necessary, a final normal is calculated.

Effects of First Exemplary Embodiment

In U.S. Pat. No. 8,134,555 B2, a normal vector is calculated on the assumption that the normal acquisition position is a certain single point. Thus, when the normal acquisition position is shifted from the single point, shifts occur in the light source vector and the line-of-sight vector calculated from the normal acquisition position, the position of the image capturing apparatus, and the light source position. Thus, the accuracy of a normal calculated using these vectors decreases. In the present exemplary embodiment, however, the calculation of a normal (step S403) and the calculation of a depth (step S406) are repeatedly performed, thereby gradually making the normal and the depth highly accurate. Then, when the accuracy of the normal is equal to or greater than a predetermined value (Yes in step S404), the repetitive processing ends, and the normal is output from the image processing apparatus 100. That is, in the present exemplary embodiment, after a normal is calculated, and if the angle between the normal and an already calculated normal (or a prepared normal) is equal to or greater than a threshold, a depth (a normal acquisition position) is corrected using the most recently calculated normal. Then, a normal is calculated again using the corrected normal acquisition position, the already acquired position of a light source, and the already acquired position of an image capturing apparatus.

Thus, the image processing apparatus 100 according to the present exemplary embodiment considers the size and the shape of the object 203 (i.e., considers the difference in the normal acquisition position on the object 203), thereby reducing and correcting a shift in the normal acquisition position (shifts in an incident ray vector and a line-of-sight vector). This improves the calculation accuracy of a normal.

Figure 6:
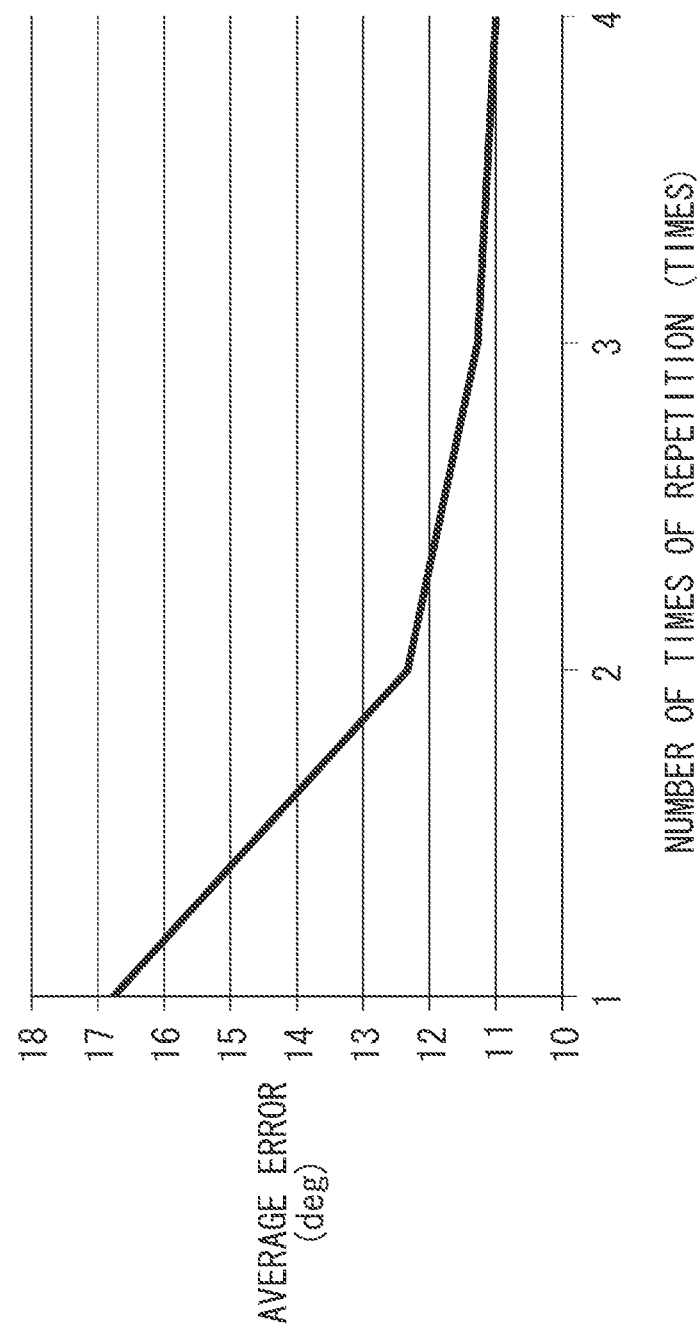
FIG. 6 is a diagram illustrating an example of a processing result of the image processing apparatus.

To prove the effects of the present exemplary embodiment, an angle error in a normal was calculated when the above repetitive processing was applied to a computer graphics (CG) image of a cubic model. FIG. 6 illustrates the calculation results. FIG. 6 is a graph illustrating a normal calculation error, where the horizontal axis is the number of times of repetition, and the vertical axis is an angle error occurring in a normal. It is understood from FIG. 6 that the calculation accuracy of a normal is improved by the repetitive processing.

(Variations)

In the above exemplary embodiment, the secondary storage device 104 is included in the image processing apparatus 100. Alternatively, the secondary storage device 104 may be provided outside the image processing apparatus 100. Further, the input device 108 and the display device 110 are provided outside the image processing apparatus 100. Alternatively, the input device 108 and the display device 110 may be included in the image processing apparatus 100. In the above exemplary embodiment, a spherical object (the object 203) is placed on the image capturing stage 204. Alternatively, the object may be a person. For example, the above processing can also be applied in a case where the head (the face) of a person seated in a chair is a normal calculation target object. This is because the above processing uses specularly reflected light and thereby can acquire a normal to even a translucent object such as the head of a person with high accuracy. Further, the image capturing stage 204 is included in the normal calculation system 200. Alternatively, the image capturing stage 204 may not be included in the normal calculation system 200.

In the above exemplary embodiment, the image acquisition unit 301 acquires a normal calculation image and extracts specularly reflected light. Alternatively, regarding the extraction of the specularly reflected light, a specularly reflected light extraction unit may be provided and extract the specularly reflected light.

The image processing apparatus 100 can be composed of a personal computer (PC), for example. Alternatively, the image processing apparatus 100 can also be composed of an apparatus (e.g., a tablet computer or a wearable computer) other than the PC.

In the above exemplary embodiment, the light source apparatus 202 including a plurality of point light sources is used. Alternatively, the light source apparatus 202 may include a single light source. For example, images obtained by continuously capturing the object 203 while gradually moving the single light source are added together, whereby it is possible to obtain an image of the object 203 irradiated with light from a plurality of light sources. In the above exemplary embodiment, any apparatus for calculating a normal to an object at a normal acquisition position using the position of a light source, the normal acquisition position, and the position of an image capturing apparatus, and correcting the normal acquisition position using the calculated normal regardless of the number of light sources can be applied. That is, in the above exemplary embodiment, any apparatus for performing control to calculate a normal again using a corrected normal acquisition position, the position of a light source, and the position of an image capturing apparatus can be applied. Further, in the above exemplary embodiment, the light source apparatus 202 includes point light sources. Alternatively, the light sources may be light sources other than the point light sources.

The functional block configuration illustrated in FIG. 3 is an example. Alternatively, a plurality of functional blocks may be included in a single functional block, or any of the functional blocks may be divided into blocks for performing a plurality of functions. Yet alternatively, at least one of the functional blocks may be implemented as hardware. In a case where at least one of the functional blocks is implemented as hardware, for example, a predetermined compiler may be used, thereby automatically generating a dedicated circuit on a field-programmable gate array (FPGA) from a program for achieving the steps. Further, a gate array circuit may be formed similarly to the FPGA, and at least one of the functional blocks may be achieved as hardware. Further, at least one of the functional blocks may be achieved by an application-specific integrated circuit (ASIC).

According to the present disclosure, it is possible to calculate a normal to an object with higher accuracy.

Other Embodiments

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, and one or more memories (e.g., central processing unit (CPU), micro processing unit (MPU)), and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2017-030152, filed Feb. 21, 2017, which is hereby incorporated by reference herein in its entirety.

What is claimed is:

1. An image processing apparatus comprising:
one or more processors; and
one or more memories storing instructions, when executed by the one or more processors, causing the apparatus to function as:
a first acquisition unit configured to acquire first position information indicating a first position of a light source for irradiating an object with light;
a second acquisition unit configured to acquire second position information indicating a second position where a normal is calculated in the object;
a third acquisition unit configured to acquire third position information indicating a third position of an image capturing apparatus for imaging the object irradiated with the light by the light source;
a calculation unit configured to, based on the first position information, the second position information, and the third position information, calculate a normal at the second position; and
a determination unit configured to determine whether processing including correction of the second position and calculation of a normal at the corrected second position is to be performed,
wherein until the determination unit determines that the processing is not to be performed, the calculation unit repeatedly performs the processing,
wherein the first position is a position where the light source irradiates the object with light so that the image capturing apparatus captures specular reflection light on the second position, and
wherein in a case where an angle between a normal calculated in the processing for an m-th time and a normal calculated in the processing for an (m−1)-th time is less than a predetermined threshold, the determination unit determines that the processing is not to be performed, where m is a positive integer.

2. The image processing apparatus according to claim 1, wherein based on intensity of specularly reflected light from the object acquired using the image capturing apparatus, the first acquisition unit acquires the first position information.

3. The image processing apparatus according to claim 1, wherein the calculation unit calculates the normal by calculating, based on the first position and the second position, a light source vector indicating a direction from the object to the light source, calculating, based on the third position and the second position, a line-of-sight vector indicating a direction from the object to the image capturing apparatus, and calculating a sum of the light source vector and the line-of-sight vector.

4. The image processing apparatus according to claim 1, wherein based on a distance from the image capturing apparatus to the object, the second acquisition unit acquires the second position information.

5. The image processing apparatus according to claim 1, wherein the light source includes a plurality of light sources, and the image capturing apparatus images the object irradiated with light from the plurality of light sources,
wherein the first acquisition unit acquires, as the first position information, position information of, among the plurality of light sources, a light source emitting light to be specularly reflected from a surface of the object with respect to each pixel corresponding to the object in an image, and
wherein the calculation unit calculates the normal with respect to the each pixel corresponding to the object in the image.

6. The image processing apparatus according to claim 5, wherein the light source irradiates the object with light according to a plurality of illumination patterns, and the image capturing apparatus images the object with respect to each of the plurality of illumination patterns.

7. The image processing apparatus according to claim 6, wherein the plurality of illumination patterns include an illumination pattern for causing the plurality of light sources to emit light at brightnesses different from each other, and an illumination pattern for causing the plurality of light sources to emit light at a same brightness.

8. The image processing apparatus according to claim 1, wherein the calculation unit calculates height distribution of a surface of the object using the calculated normal, and based on the height distribution, corrects the second position.

9. The image processing apparatus according to claim 8, wherein the calculation unit calculates a distance from the image capturing apparatus to the object based on the height distribution, and based on the distance from the image capturing apparatus to the object, corrects the second position.

10. The image processing apparatus according to claim 1, wherein the second position information indicates a position of a center of the object.

11. The image processing apparatus according to claim 1, wherein the one or more memories storing instructions, when executed by the one or more processors, causes the apparatus to further function as a fourth acquisition unit configured to acquire depth data indicating a distance from the image capturing apparatus to the object, or shape data indicating a shape of the object, and
wherein the second acquisition unit acquires the second position information based on the depth data or the shape data.

12. The image processing apparatus according to claim 1, wherein the object is a spherical object.

13. The image processing apparatus according to claim 1, wherein the object is a translucent object.

14. The image processing apparatus according to claim 1, wherein the object is a head of a person.

15. The image processing apparatus according to claim 1, wherein the calculation unit performs the processing for each pixel of an image captured by the image capturing apparatus.

16. The image processing apparatus according to claim 1, wherein the calculation unit calculates the normal at the second position based on a specular reflection relation among the first position, the second position, and the third position.

17. An image processing method comprising:
based on first position information indicating a first position of a light source for irradiating an object with light, second position information indicating a second position where a normal is calculated in the object, and third position information indicating a third position of an image capturing apparatus for imaging the object irradiated with the light by the light source, calculating a normal at the second position;
determining whether processing including correction of the second position and calculation of a normal at the corrected second position is performed; and
until it is determined that the processing is not to be performed, repeatedly performing the processing,
wherein the first position is a position where the light source irradiates the object with light so that the image capturing apparatus captures specular reflection light on the second position, and
wherein in a case where an angle between a normal calculated in the processing for an m-th time and a normal calculated in the processing for an (m−1)-th time is less than a predetermined threshold, the determining determines that the processing is not to be performed, where m is a positive integer.

18. A non-transitory computer-readable storage medium storing instructions that, when executed by a computer, cause the computer to perform a method comprising:
based on first position information indicating a first position of a light source for irradiating an object with light, second position information indicating a second position where a normal is calculated in the object, and third position information indicating a third position of an image capturing apparatus for imaging the object irradiated with the light by the light source, calculating a normal at the second position;
determining whether processing including correction of the second position and calculation of a normal at the corrected second position is performed; and
until it is determined that the processing is not to be performed, repeatedly performing the processing,
wherein the first position is a position where the light source irradiates the object with light so that the image capturing apparatus captures specular reflection light on the second position, and
wherein in a case where an angle between a normal calculated in the processing for an m-th time and a normal calculated in the processing for an (m−1)-th time is less than a predetermined threshold, the determining determines that the processing is not to be performed, where m is a positive integer.

* * * * *